March 8, 1932.                W. F. EAMES                1,848,873
MOTOR CONTROL SYSTEM
Filed Feb. 15, 1930
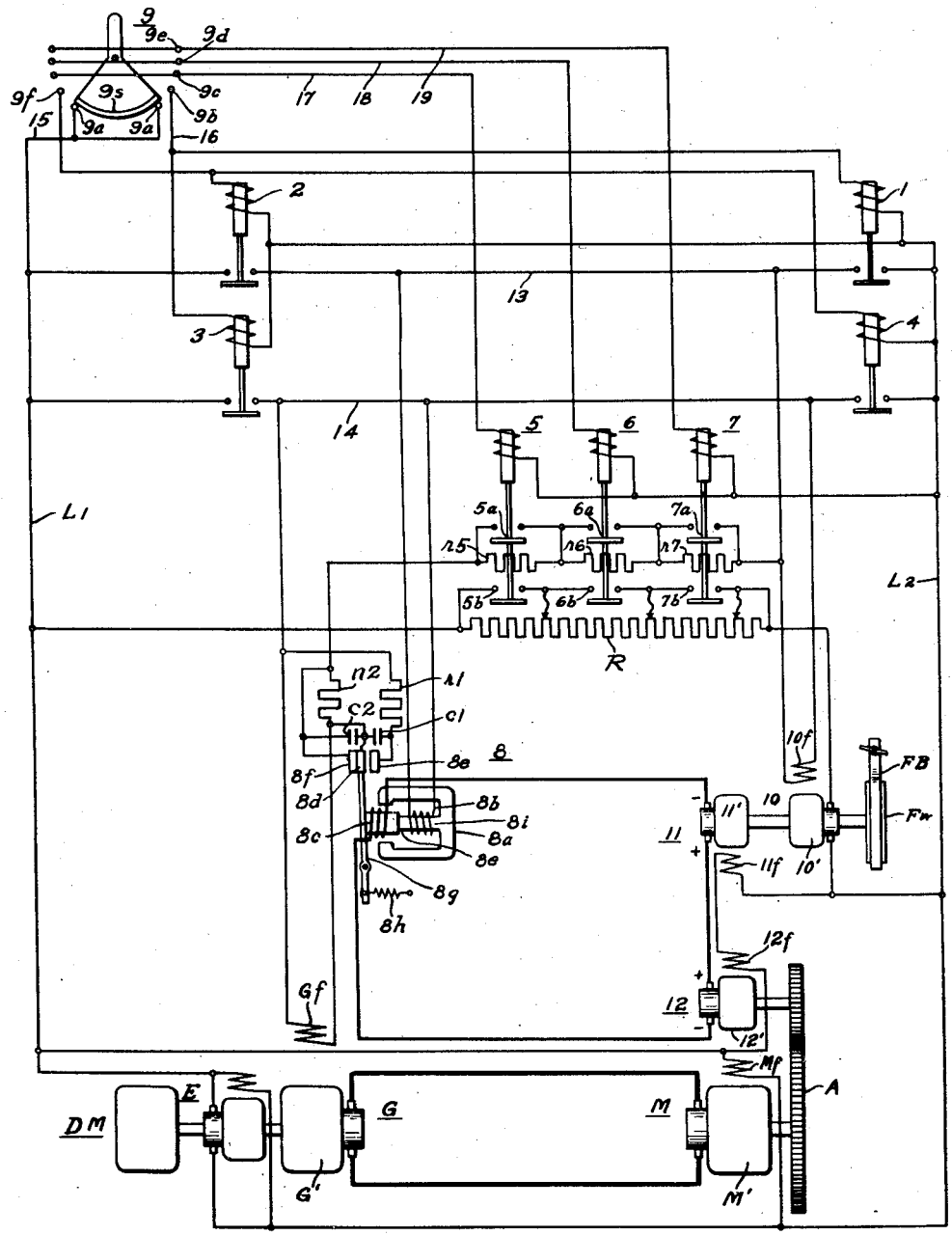
INVENTOR
William F. Eames.
BY
ATTORNEY Patented Mar. 8, 1932

1,848,873

UNITED STATES PATENT OFFICE

WILLIAM F. EAMES, OF EDGEWOOD, PENNSYLVANIA, ASSIGNOR TO WESTINGHOUSE ELECTRIC & MANUFACTURING COMPANY, A CORPORATION OF PENNSYLVANIA

MOTOR CONTROL SYSTEM

Application filed February 15, 1930. Serial No. 428,647.

My invention relates to motor control systems, and has particular relation to motor control systems of the variable voltage type, in which the motor armature is connected in a closed circuit with the armature of a variable voltage generator, the speed of the motor being determined by the generator excitation, and the direction of motor rotation being determined by suitable reversing switches in any desirable circuit of the system, preferably in the generator field circuit.

In such systems, as ordinarily constructed, the generator is separately excited and the motor is accelerated by short circuiting steps of resistance in the generator separately excited field circuit, the time constant of the generator separately excited field circuit being relied upon to determine the rate of increase or decrease of the generator voltage and consequently of the motor speed. While for many purposes such systems are reliable and satisfactory, they are not entirely suitable for applications which require uniform motor acceleration and close speed regulation, such as elevator systems. The permissible number of sections of resistance in the generator field circuit is ordinarily limited by practical considerations, so that in systems as ordinarily built, each section of resistance represents a considerable percentage of the full motor speed.

In such a system, when a step of resistance is short circuited, the generator excitation does not increase at a uniform rate, but increases abruptly at first, the rate of increase falling off as the generator field builds up. In order to follow the initial abrupt change of the generator excitation, the motor must accelerate its load at a corresponding rate, drawing a correspondingly heavy current, which gradually drops off as the motor comes up to speed. During the acceleration period, as the sections of resistance are successively short circuited, the motor current, motor torque and motor acceleration, therefore, fluctuate considerably; increasing after the short circuiting of each section of resistance then gradually decreasing until the next section of resistance is short circuited.

The motor speed regulation of such a system is inherently poor, due to the resistance drop in the armatures of the generator and motor and in the conductors connecting them, and also due to the speed regulation of the generator driving means. If the generator is provided with a cumulative series field winding of sufficient number of turns to maintain the motor speed constant regardless of the load, the motor speed tends to follow the changes of generator excitation more closely, so that variations of motor current, motor torque and motor acceleration as the motor speeds up are more pronounced. In an elevator system, the variations of acceleration are noticeable and objectionable to the passengers.

In a variable voltage system, as described above, the resistance of the generator and motor armatures varies with their temperature, so that if the generator compounding is correct for a certain operating temperature of the motor and generator, it will be incorrect for other temperatures reached during normal operation. Furthermore, the time constant of the generator separately excited field circuit does not remain the same during the entire acceleration period but changes with each change of resistance in the generator field circuit, so that if the average rate of change of generator excitation is of a desirable value during a particular interval in the acceleration period, it will not remain at this desirable value during other intervals when the resistance of the generator field circuit is of a different value.

The time constant of the generator field circuit can only be altered within certain limits determined by the design of the generator and the voltages available for the generator field circuit, so that adjustment of the motor acceleration characteristics to suit the requirements of a particular application cannot always be carried to as fine a degree as desirable.

For many reasons, therefore, it is desirable to control the acceleration and deceleration of the motor of a variable voltage system independently of the time constant of the generator separately excited field.

In is accordingly an object of my invention to provide a variable voltage motor control system, in which the acceleration and deceleration of the motor may be controlled independently of the time constant of the generator separately excited field.

Another object of my invention is to provide a variable voltage motor control system in which the acceleration and deceleration of the motor may be effected in a smooth and uniform manner and in which the period of acceleration and deceleration may be adjusted over a wide range.

Another object of my invention is to provide a variable voltage motor control system in which means are provided for maintaining the motor speed constant independent of variations of load, and in which the motor speed regulation is independent of changes in temperature of the generator and motor armatures.

The arrangement by which I accomplish the foregoing objects is related to the arrangements disclosed in my co-pending applications, Serial No. 445,303, filed April 18, 1930, and Serial No. 445,304, filed April 18, 1930.

According to my invention, I control the field of the main generator in accordance with the difference between the voltages of a generator accelerated smoothly at an adjustable rate by an auxiliary motor and a generator driven from the main motor shaft, so that the main motor speed is held proportional to the speed of the auxiliary motor, regardless of variations of motor load or of variations in temperature of the main motor and generator armatures during operation.

Other objects of my invention will become evident from the following detailed description taken in conjunction with the accompanying drawing in which the single figure is a diagrammatic view of a system of control organized in accordance with the present invention.

Referring to the drawing, a direct current main motor M, the operation of which is to be controlled, has its armature M' connected in a closed circuit with the armature G' of a direct current main generator G. A pair of supply conductors L1 and L2 are provided for supplying the direct current used in the control system. The supply conductors L1 and L2 are energized from any suitable supply, such as an exciter E, mounted on the shaft of the main generator G. The main generator G and exciter E are driven at substantially constant speed by any suitable driving means DM.

A conductor 13 is arranged to be connected to supply conductor L1 by means of a reversing switch 2 or to supply conductor L2 by means of a reversing switch 1 and a similar conductor 14 is arranged to be connected to supply conductor L1 by means of a reversing switch 3 or to supply conductor L2 by means of a reversing switch 4. The reversing switches 1 and 3 are arranged to be operated together from a contact member 9b of a manual controller 9 and reversing switches 2 and 4 are arranged to be operated together from a contact member 9f of the manual controller 9.

The separately excited field winding $Gf$ of the main generator G is connected to the conductors 13 and 14 in series with resistors $r2$, $r5$, $r6$ and $r7$. A circuit comprising a resistor $r1$ and contact members $8d$ and $8e$ of a regulator 8 (the regulator to be hereinafter more fully described) is connected in parallel to the circuit of the main generator separately excited field winding $Gf$.

The resistance values of resistors $r1$ and $r2$ are so related to the inductance of the generator field winding $Gf$ and the voltage of supply conductors L1 and L2 that the excitation of main generator G may be varied rapidly by the regulator 8 over the entire working range.

A plurality of accelerating relays 5, 6 and 7 are arranged to short circuit resistors $r5$, $r6$ and $r7$, respectively, by means of contact members $5a$, $6a$ and $7a$, respectively. In addition to the contact members $5a$, $6a$ and $7a$, the accelerating relays 5, 6 and 7 are provided with a set of contact members $5b$, $6b$ and $7b$ for short circuiting adjustable sections of a resistor R. The resistor R is connected in series with the armature $10'$ of an auxiliary motor 10 to the supply conductors L1 and L2.

A manual controller 9 is arranged to connect the operating coils of reversing switches 1 and 3 or 2 and 4 to the supply conductors L1 and L2 and to thereafter connect the operating coils of relays 5, 6 and 7 in sequence to the supply conductors L1 and L2, in well-known manner, to cause acceleration of the motor M in either direction.

The regulator 8 may be of any type, but is preferably of the moving coil type, described in the co-pending application of Walter Schaelchlin, Serial No. 221,422, filed September 23, 1927, (W. E. case 12,060), and assigned to the Westinghouse Electric and Manufacturing Company. This regulator comprises a magnetic structure $8a$ having a core $8i$ on which is mounted a stationary coil $8b$. A pivoted armature $8g$ of non-magnetic material carries a movable coil $8c$ and a movable contact member $8d$. The movable coil $8c$ is arranged in inductive relation to the magnetic structure $8a$, as is the stationary coil $8b$. The movable contact member $8d$ is arranged to engage a stationary contact member $8f$ in one position of the armature $8g$ or to engage a second stationary contact member $8e$ in another position of the armature, the distance between stationary contact members $8f$ and $8e$ being sufficient to permit the movable contact member $8d$ to assume a neutral position in which neither stationary contact member is engaged. The armature 8g is biased by a spring 8h to the position in which movable contact member 8d engages stationary contact member 8f. The contact members 8d, 8e and 8f are so connected to the external circuit that when contact member 8d engages contact member 8f, the resistor r2 in the main generator separately excited field circuit is short circuited to increase the generator excitation, and when the contact member 8d engages the contact member 8e, the resistor r1 is connected in shunt to the main generator field winding Gf, to reduce the generator excitation. A condenser C1 is connected between the contact members 8d and 8e to reduce sparking at the regulator contact members and a similar condenser C2 for a similar purpose is connected between the contact members 8d and 8f.

The movable coil 8c of the regulator 8 is connected in a closed circuit with the armatures 11′ and 12′ of two auxiliary generators 11 and 12, respectively. The field windings 11f and 12f of the auxiliary generators 11 and 12 are connected in series to the supply conductors L1 and L2.

The stationary coil 8b of the regulator 8 and the field winding 10f of the auxiliary motor 10 are each connected to the conductors 13 and 14 so that their polarity will be reversed whenever the polarity of the main generator field Gf is reversed.

The main motor field winding Mf is connected to the supply conductors L1 and L2.

The auxiliary generator 11, the auxiliary motor 10 and a flywheel Fw are mounted on a common shaft. An adjustable friction brake FB is mounted on the rim of the flywheel Fw, the arrangement being such that by adjusting the friction brake FB and the resistance R, the acceleration period of the arrangement may be varied between suitable limits, for example 1½ seconds and 4 seconds.

Auxiliary generator 12 is driven from the shaft of main motor M by suitable gearing A of such ratio that the voltage generated by generator 12 when the main motor M is operating at full speed, exceeds the voltage generated by generator 11 when the auxiliary motor 10 is operating at full speed by an amount just sufficient to cause a current to flow in the movable coil 8c of the regulator 8, of such value that the force on the movable coil overcomes the tension of the spring 8h, and the movable contact member 8d stands in neutral position. The field and armature circuits of auxiliary motor 10 and auxiliary generators 11 and 12 are connected in such direction that the voltage of generator 11 opposes the voltage of generator 12, as indicated by plus and minus signs on the drawing, the polarity of both generators, however, being reversed when the main motor is reversed.

The operation of the above-described apparatus may be set forth as follows: Assuming that the main generator G and exciter E are being driven by their common driving means DM and the manual controller 9 is centered; the supply conductors L1 and L2 are energized, the field windings of the main motor M and auxiliary generators 11 and 12 are energized, the armature of pilot motor 10 is connected to supply conductors L1 and L2 in series with resistor R, the main generator separately excited field Gf is disconnected and the reversing switches 1, 2, 3 and 4 and accelerating relays 5, 6 and 7 are all open. The main driving motor M is at rest as no voltage is impressed across its armature. The auxiliary motor 10 is held at rest by the brake FB, its torque being slight since its field circuit is open. The main motor M and auxiliary machines 10, 11 and 12 are therefore all at rest.

If the handle of the manual controller 9 is moved to the left, the contact segment 9s of the controller bridges contact members 9a and 9b, completing a circuit for the operating coils of reversing switches 1 and 3. This circuit may be traced as follows: from supply conductor L1 through conductor 15, contact members 9a, 9s and 9b of the controller 9, conductor 16, thence in parallel through the operating coils of reversing switches 1 and 3 to supply conductor L2. Reversing switches 1 and 3 close connecting the main generator separately excited field winding Gf to supply conductors L1 and L2 in series with resistors r2, r5, r6 and r7 and connecting the stationary coil 8b of regulator 8 and the field winding 10f of motor 10 to supply conductors L1 and L2. The generator G now generates a low voltage and the main motor M begins to turn. At the same time the auxiliary motor 10 begins to turn against the retarding force of friction brake FB and the inertia of fly wheel Fw. As the main motor M speeds up, the voltage of generator 12 increases, and as the auxiliary motor 10 speeds up the voltage of generator 11 increases. If the voltage of generator 12 exceeds the voltage of generator 11 by more than a predetermined amount, the force on the moving coil 8c of the regulator 8 overcomes the tension of the spring 8h, so that the moving contact 8d of the regulator 8 engages the stationary contact 8e, connecting the resistor r1 in shunt to the generator field winding, thereby reducing the voltage of main generator G and the speed of motor M. If the voltage of generator 12 falls below a predetermined value in excess of the voltage of generator 11, the moving contact member 8d of the regulator 8 engages the stationary contact member 8f, short circuiting the resistor r2, thereby increasing the voltage of generator G and the speed of motor M. The regulator 8 thus vibrates, holding the speed of the main motor M at a value proportional to the speed of auxiliary motor 10, independently of the time constant of the main generator field. The pilot motor 10 continues to speed up until it reaches a speed at which its torque, limited by the resistor R, equals the retarding torque of the brake FB, the speed of the main motor remaining at all times proportional to the speed of auxiliary motor 10.

If the manual controller is moved to the next operating point, contact segment $9s$ of the manual controller bridges contact members $9a$ and $9c$, completing a circuit for the operating coil of accelerating relay 5 as follows: from supply conductor L1 through conductor 15, contact members $9a$, $9s$ and $9c$, conductor 17, the operating coil of accelerating relay 5, thence to supply conductor L2. Accelerating relay 5 closes, short-circuiting the resistor $r5$ in the field circuit of the main generator and short-circuiting a section of the resistor R in the armature circuit of auxiliary motor 10. The auxiliary motor 10 now accelerates to a higher speed, the speed of the main motor M being held during the acceleration period and thereafter at a speed proportional to the speed of motor 10 by regulator 8. The short-circuiting of resistor $r5$ has no effect on the speed of main motor M, as the regulator 8 and resistors $r1$ and $r2$ are designed to control the motor speed independently of the resistors $r5$, $r6$ and $r7$. The resistors $r5$, $r6$ and $r7$, however, provide a rough adjustment of the generator excitation, thereby reducing the current carried by the regulator contact members and prolonging the useful life of the regulator.

If the manual controller 9 is moved to the next operating point, contact segment $9s$ of the controller bridges contact members $9a$ and $9d$, thereby completing a circuit for the operating coil of accelerating relay 6. This circuit extends from supply conductor L1, through conductor 15, contact members $9a$, $9s$ and $9d$ of the manual controller, conductor 18, thence through the operating coil of accelerating relay 6 to supply conductor L2. Accelerating relay 6 closes, short-circuiting resistor $r6$ in the main generator field circuit and a second section of resistor R in the armature circuit of pilot motor 10. Pilot motor 10 accelerates to a higher speed, the speed of the main motor remaining proportional to the speed of the pilot motor during the acceleration period and thereafter while the pilot motor 10 operates at constant speed.

If the manual controller 9 is moved to the last operating point, contact segment $9s$ of the controller bridges contact members $9a$ and $9e$, thereby completing a circuit for the operating coil of accelerating relay 7. This circuit extends from supply conductor L1, through conductor 15, contact members $9a$, $9s$ and $9e$ of the manual controller, conductor 19 thence through the operating coil of accelerating relay 7 to supply conductor L2. Accelerating relay 7 closes short-circuiting resistor $r7$ in the main generator field circuit and a third section of resistor R in the armature circuit of auxiliary motor 10. Auxiliary motor 10 now accelerates to full speed, the speed of the main motor remaining proportional to the speed of the auxiliary motor during the acceleration and thereafter while the auxiliary motor 10 operates at constant speed.

When the load on the main motor M or the temperature of the armatures of motor M and generator G change, the ratio of the generated voltage of generator G to the counter E. M. F. of motor M changes, but the speed of motor M remains constant, the change being compensated for by a change in the excitation of generator G caused by the regulator 8.

If the manual controller 9 is now returned to neutral position, the steps described above for acceleration are followed in reverse sequence, the motor M being decelerated smoothly under control of auxiliary motor 10.

If the handle of manual controller 9 is moved to the right, reversing switches 2 and 4 close, energizing the main generator field winding $Gf$, the stationary coil $8b$ of regulator 8 and the field winding $10f$ of auxiliary motor 10 in the reverse direction. The main motor M, the auxiliary motor 10, and auxiliary generators 11 and 12 now operate in the reverse direction, the voltages of both generators 11 and 12 being reversed so that they still oppose each other. The operation is otherwise identical with that described above.

The main motor M may obviously be operated continuously at any of a plurality of speeds below high speed by arresting the manual controller at a corresponding operating position.

By adjusting the proportion of resistor R controlled by the accelerating relays 5, 6 and 7, the operating speeds of the main motor M may be fixed at any desired value within a considerable range, and by adjusting the friction brake FB, the rate of acceleration of the main motor M may be adjusted to suit requirements.

While I prefer to use a regulator of a specified type operating upon the generator separately excited field, because of the advantages of this arrangement, it will be understood that my invention is not limited specifically thereto. I may, for example, omit the spring $8h$ of the regulator 8, in which case the regulator 8 would operate to maintain the difference between the voltages of generators 11 and 12 at a different predetermined value from the value maintained in the arrangement shown. If the spring 8h is omitted, the predetermined value would be zero. Alternatively, I may use an entirely different type of regulator. While I prefer to introduce the control in the generator field circuit, because of the advantages of this arrangement, I may introduce the control in other circuits of the system, consistent with the desired result of maintaining the speed of the main motor proportional to the speed of the auxiliary motor. Finally, while I prefer to use two generators (11 and 12) for producing a voltage proportional to the difference in speed of the main motor and a predetermined control speed, I may use other arrangements for accomplishing the same result.

I do not, therefore, wish to be restricted to the specific structural details, arrangement of parts or circuit connections herein set forth, as various modifications thereof may be effected without departing from the spirit and scope of my invention. I desire, therefore, that only such limitations shall be imposed as are indicated in the appended claims.

I claim as my invention:

1. In a motor control system, a motor, a generator, means for driving said generator, electrical connections between the armatures of said motor and said generator, resistance connected with a field winding of said generator, means for producing a voltage proportional to the difference between the actual speed of said motor and a predetermined control speed, and a regulator responsive to said voltage for controlling said resistance to increase the excitation of said generator when the actual speed of said motor is below said control speed.

2. In a motor control system, a motor, a generator, means for driving said generator, electrical connections between the armatures of said motor and said generator, resistance connected with a field winding of said generator, means for producing a voltage proportional to the difference between the actual speed of said motor and a predetermined control speed, and a regulator responsive to said voltage for controlling said resistance to decrease the excitation of said generator when the actual speed of said motor exceeds said control speed.

3. In a motor control system, a motor, a generator, means for driving said generator, electrical connections between the armatures of said motor and said generator, resistance connected with a field winding of said generator, means for producing a voltage proportional to the difference between the actual speed of said motor and a predetermined control speed, and a regulator responsive to said voltage for controlling said resistance to increase the excitation of said generator when the actual speed of said motor is below said control speed and for decreasing the excitation of said generator when the actual speed of said motor exceeds said control speed.

4. In a motor control system, a motor, a generator, means for driving said generator, electrical connections between the armatures of said motor and said generator, resistance connected with a field winding of said generator, means for producing a voltage proportional to the difference between the actual speed of said motor and a predetermined control speed, and a regulator for controlling said resistance to vary the excitation of said generator in accordance with said voltage to maintain said voltage at a predetermined value.

5. In a motor control system, a main motor, a main generator, means for driving said main generator, electrical connections between the armatures of said main motor and said main generator, an auxiliary motor, means for controlling the speed of said auxiliary motor, an auxiliary generator, means for driving said auxiliary generator at a speed proportional to the speed of said main motor, a second auxiliary generator, means for driving said second auxiliary generator at a speed proportional to the speed of said auxiliary motor, and means responsive to the algebraic sum of the voltages of said auxiliary generators for controlling the excitation of said main generator to maintain said algebraic sum at a predetermined value.

6. In a motor control system, a main motor, a main generator, means for driving said main generator, electrical connections between the armatures of said main motor and said main generator, an auxiliary motor, means for controlling the speed of said auxiliary motor, an auxiliary generator, means for driving said auxiliary generator at a speed proportional to the speed of said main motor, a second auxiliary generator, means for driving said second auxiliary generator at a speed proportional to the speed of said auxiliary motor, and means responsive to the difference of the voltages of said auxiliary generators for controlling the excitation of said main generator to maintain said difference at a predetermined value.

7. In a motor control system, a main motor, a main generator, means for driving said main generator, electrical connections between the armatures of said main motor and said main generator, an auxiliary motor, means for controlling the speed of said auxiliary motor, an auxiliary generator, means for driving said auxiliary generator at a speed proportional to the speed of said main motor, a second auxiliary generator, means for driving said second auxiliary generator at a speed proportional to the speed of said auxiliary motor, and a regulator responsive to the algebraic sum of the voltages of said auxiliary generators for controlling the excitation of said main generator to maintain said algebraic sum at a predetermined value.

In testimony whereof, I have hereunto subscribed my name this 12th day of February, 1930.

WILLIAM F. EAMES.